(12) United States Patent
Lambertz et al.

(10) Patent No.: US 9,932,136 B2
(45) Date of Patent: Apr. 3, 2018

(54) METHOD FOR MAKING POUCHES AND A POUCH AS SUCH

(71) Applicants: TEEPACK SPEZIALMASCHINEN GMBH & CO. KG, Meerbusch (DE); MOLINS PLC, Milton Keynes (GB)

(72) Inventors: Stefan Lambertz, Hurth (DE); Phil Haddow, Potton (GB); Peter John Whitlock, Leek Wootton (GB); Bradley Wiggett, Birmingham (GB); Michael Klein, Willich (DE); Hans Knops, Krefeld (DE); Wolfgang Reichel, Willich (DE)

(73) Assignees: Teepack Spezialmaschinen GmbH & Co. KG, Meerbusch (DE); Molins PLC, Milton Keynes (GB)

( * ) Notice: Subject to any disclaimer, the term of this patent is extended or adjusted under 35 U.S.C. 154(b) by 0 days.

(21) Appl. No.: 14/378,078

(22) PCT Filed: Sep. 28, 2012

(86) PCT No.: PCT/EP2012/004081
§ 371 (c)(1),
(2) Date: Aug. 11, 2014

(87) PCT Pub. No.: WO2013/117204
PCT Pub. Date: Aug. 15, 2013

(65) Prior Publication Data
US 2015/0037467 A1    Feb. 5, 2015

(30) Foreign Application Priority Data

Feb. 10, 2012    (EP) .................................. 12000884.2

(51) Int. Cl.
*B65B 29/04*    (2006.01)
*B65B 29/02*    (2006.01)
(Continued)

(52) U.S. Cl.
CPC .............. *B65B 29/02* (2013.01); *B65B 29/04* (2013.01); *B29C 65/40* (2013.01); *B65D 33/14* (2013.01); *B65D 85/808* (2013.01)

(58) Field of Classification Search
CPC ......... B65B 29/02; B65B 29/04; B31B 19/90; B29C 66/225; B29C 65/50; B29C 65/52; B29C 65/40; B65D 85/804–85/8085
(Continued)

(56) References Cited

U.S. PATENT DOCUMENTS

| 1,557,032 A | 10/1925 | Cooper |
| 2,186,087 A | 1/1940 | Yates |

(Continued)

FOREIGN PATENT DOCUMENTS

| CN | 1152283 A | 6/1997 |
| CN | 102149601 A | 8/2011 |

(Continued)

OTHER PUBLICATIONS

Chinese Office Action for Chinese Patent Application No. 2012800720088, Chinese Office Action for Chinese Patent Application No. 2012800720088, dated Mar. 29, 2016 (1 page).

(Continued)

*Primary Examiner* — Stephen F Gerrity
*Assistant Examiner* — Joshua Kotis
(74) *Attorney, Agent, or Firm* — Dorsey & Whitney LLP (57) ABSTRACT

The present invention relates to a pouch and a method for making the same. In the inventive method, which is adapted to produce pouches having a limited amount of fusible material, a heat-sealable cord is arranged on a web forming confronting side surface of each pouch. Those confronting side surfaces are fused by heating the heat-sealable cord. The present invention furthermore provides a pouch, in particular containing a brewable or extractable commodity (Continued)

such as tea, with a pocket defined between confronting side surfaces of a web. The pouch of the present invention can have a limited amount of fusible material as the confronting side surfaces are joined by solidified melt of a heat-sealable cord arranged in vicinity of at least one edge of the pouch.

8 Claims, 6 Drawing Sheets

(51) Int. Cl.
    *B29C 65/40*     (2006.01)
    *B65D 85/808*     (2006.01)
    *B65D 33/14*     (2006.01)

(58) Field of Classification Search
    USPC ............... 53/413, 414, 415, 419; 426/82, 83
    See application file for complete search history.

(56) References Cited

U.S. PATENT DOCUMENTS

| | | | | |
|---|---|---|---|---|
| 2,335,159 A * | 11/1943 | Salfisberg | ............ | B65D 85/808 156/176 |
| 2,359,271 A * | 9/1944 | Sidebotham | ............ | B65B 29/04 426/394 |
| 2,406,018 A * | 8/1946 | Irmscher | ................ | B65B 29/04 206/0.5 |
| 2,556,609 A * | 6/1951 | Arkless | ............ | B05C 17/00533 156/500 |
| 2,787,548 A * | 4/1957 | Dannenhoffer | ........ | B65D 75/54 426/394 |
| 3,283,672 A * | 11/1966 | Mueller | ................. | B31B 19/90 156/167 |
| 3,514,361 A * | 5/1970 | Welin-Berger | ........... | B31F 5/04 156/277 |
| 3,935,810 A * | 2/1976 | Milano | ................ | B29C 43/305 206/389 |
| 4,801,464 A * | 1/1989 | Hubbard, Jr. | ........... | B65B 29/02 206/0.5 |
| 4,946,539 A * | 8/1990 | Ales | ......................... | A42C 1/00 156/495 |
| 5,399,224 A * | 3/1995 | Vernon | ................... | B29C 65/18 156/265 |
| 5,511,359 A * | 4/1996 | Kenney | .................. | B29C 65/02 53/134.2 |
| 5,552,164 A * | 9/1996 | Kuipers | ............... | B65D 85/812 206/0.5 |
| 5,632,132 A * | 5/1997 | Kuipers | .................. | B65B 29/04 426/79 |
| 5,870,880 A | 2/1999 | Ramagnoli | | |
| 5,878,550 A * | 3/1999 | Cahill | ..................... | B65B 29/04 53/134.2 |
| 5,951,452 A * | 9/1999 | Stevenson | ................. | B65B 9/02 493/193 |
| 5,979,144 A * | 11/1999 | Bailey | ....................... | B65B 9/02 53/134.2 |
| 6,443,935 B1 * | 9/2002 | Gustafsson | ........ | A61F 13/15601 156/161 |
| 9,382,064 B2 * | 7/2016 | Rivola | .................... | B29C 65/18 |
| 2011/0047937 A1 * | 3/2011 | Tsuji | ................... | B29C 66/4312 53/413 |

FOREIGN PATENT DOCUMENTS

| | | |
|---|---|---|
| CN | 102149604 A | 8/2011 |
| DE | 1153673 B | 8/1963 |
| DE | 9411639 U1 | 11/1994 |
| EP | 1002742 A1 | 5/2000 |
| GB | 881784 | 11/1961 |
| GB | 938337 | 10/1963 |
| WO | 95/10462 A1 | 4/1995 |
| WO | 02/40263 A1 | 5/2002 |
| WO | 2002/40263 A1 | 5/2002 |
| WO | 2007/089838 A3 | 8/2007 |

OTHER PUBLICATIONS

Chinese Patent Office, First Office Action dated Jun. 30, 2015 for Chinese application No. 201280072008.8, 8 pages.
Prosecution Document, "European Search Report", European Search Report dated Jun. 15, 2012 for Application No. 12000884.2-2308, 3 pages.
Prosecution Document, PCT International Search Report dated Mar. 22, 2013 for International Application No. PCT/EP2012/004081, 4 pages.
Chinese Office Action of related Chinese Application Serial No. 2014555946, dated Oct. 6, 2015 (5 pages).
Communication Pursuant to Article 94(3) EPC, dated Apr. 14, 2016 in EP Application No. 12 769 932.0.
Japanese Office Action for Japanese Patent Application No. 2014-555946, Japanese Office Action for related Japanese Patent Application No. 2014-555946, dated Jul. 5, 2016 (3 pages).

* cited by examiner

METHOD FOR MAKING POUCHES AND A POUCH AS SUCH

CROSS REFERENCE TO RELATED APPLICATIONS

This application is the national stage application of International patent application No. PCT/EP2012/004081, entitled "A Method for Making Pouches and a Pouch as Such," and filed on Sep. 28, 2012, which claims priority to European application No. 12000884.2, entitled "A Method for Making Pouches and a Pouch as Such" and filed on Feb. 10, 2012, which are hereby incorporated by reference herein in their entireties.

BACKGROUND OF THE INVENTION

A method for producing pouches comprising the steps of providing a continuous web, folding the web to provide confronting side surfaces joined along a bottom edge and forming a vertical seal between the confronting side surfaces, thereby providing a series of adjacent pockets having opposite side walls, with each pocket having an unsealed opening along a top edge, and filling the pockets through the opening with material and then sealing the opening to provide sealed pouches is known from WO 2007/089838 A2.

In the known method, the continuous web is guided through a vertical sealer in which the vertical seals are formed after the continuous web has been folded. Those vertical seals are spaced from one another to provide a pocket which is defined by the bottom edge as the bottom of the pocket and a leading edge which is defined by a vertical seal, and a trailing edge which is defined by the neighboring vertical seal. The vertical seal is provided such that neighboring pockets can be separated without impeding the closure of the pocket by the vertical seal. By separating the pockets, individual pouches are formed.

In the method known from WO 2007/089838 A2, the continuous web is transferred to a cutting section in which the continuous web is cut to isolate individual pouches having an unsealed opening along the top edge. Those pouches are transferred by a vacuum belt transport means against which the separated pouches are sucked and transferred to a filler wheel. The filler wheel has gripping elements which are adapted to grip the leading and trailing edges of each pouch, respectively, between jaws and are movable relative to each other to open the unsealed opening. As the distance between the leading and the trailing edges of one single pouch is reduced, the distance between the confronting side surfaces in increased. Accordingly, spouts of a spout wheel can be introduced into the pouches for filling the same with material. The spout wheel and the filler wheel are rotatably driven. The rotational axis of the filler wheel is essentially co-axial to the rotational axis of the spout wheel. However, the rotational axes are slightly inclined relative to each other. At a circumferential section in which the distance between the spout wheel and the filler wheel is at its minimum, a respective spout is received within the open mouth of the pouches and then continuously retracted from the pouch as the filler wheel and the spout wheel are continuously rotated, starting from this position.

After the pouches have been filled, the gripping means are actuated such that the distance between the leading and the trailing edges of the each spout are increased, thereby bringing the confronting side surfaces closer together and closing the unsealed opening. In the course of the circular path along the outer circumference of the filler wheel, the pouches are finally sealed by a sealing section arranged at the outer circumference of the filler wheel and provided with heated sealing surfaces abutting against the folded web material for sealing the opening.

The method known from WO 2007/089838 A2 and the apparatus for carrying out said method is disadvantageous in that it requires a fusible film material for making the web. The fusible material is e.g. a plastic foil forming the web. However, fusible film materials are not suitable for packing brewable or extractible commodities like e.g. tea, coffee or the like, as foil material as such is not permeable for water.

U.S. Pat. No. 2,787,548 A describes a pouch in the form of a tea bag, the confronting side surfaces thereof being formed by a filter paper. This filter paper is coated with a thermoplastic coating, such that the entire confronting side surfaces defining a pocket for receiving the brewable or extractable commodity is coated. The web material disclosed in this prior art is fusible and, hence, suitable for being processed in the method known from WO 2007/089838 A2. However, coating of the entire confronting side surfaces of the pouch is disadvantageous as it may impede the taste of a fluid made by extracting or brewing the commodity contained in the pouch. Further, the thermoplastic coating on the filter material not only affect the taste, but also prevents or at least prolongs composting of the pouches after use.

It is an object of the present invention to provide a pouch not having the aforementioned drawbacks and a method for producing the same.

BRIEF SUMMARY OF THE INVENTION

As a solution to the above object, the present invention proposes a method for making pouches including a heat-sealable cord is arranged on a web adapted to form the confronting side surfaces. The confronting side surfaces are then joined by fusing the heat-sealable cord. In other words, in the inventive method, the heat-sealable cord provides a melt by fusing the heat-sealable cord. This melt interfuses the confronting side surfaces and, thus, joins the confronting side surfaces of the web so as to define a pocket in which the commodity can be arranged or is arranged. The term "confronting surfaces" in the meaning of the present invention can likewise be understood as addressing surfaces of the web, which are adjacent to each other and/or are facing each other in the final state of the pouch and/or the open, unfilled pouch. Respective term is to address the fact that the pouch may exclusively or—in case of a gusset—at least predominantly provide a pocket which is defined between two essentially parallel layers of a web, which layers can be formed by a single piece or by at least two separate pieces of the web. The commodity can be arranged on a section of the web prior to arranging the heat-sealable cord on the web, during arranging the heat-sealable cord on the web or thereafter.

The web can be provided in one or more pieces of predetermined lengths which are provided with the heat-sealable cord and thereafter joined by heating and, thus, melting at least a portion of the heat-sealable cord. The heat-sealable cord may in the course of fusing completely be melted to interfuse the material defining the confronting side surfaces. As the present application in particular aims to provide a pouch containing brewable or extractable commodity, which requires a infiltratable, i.e. water permeable web material, joining of the web material by means of the melt formed by heating the heat-sealable cord is denoted as interfusing. Nevertheless, the inventive method will likewise be applicable for joining non-perfusible web materials like e.g. sheets made of plastic, paper, metal foil or the like. Accordingly, the term "interfused" as used in connection with the description of the inventive method may likewise be understood as melting and, thus, solidifying on the confronting side surfaces to thereby join the same without wicking or penetrating the web material.

The claimed method allows joining of confronting side surfaces by fusing, i.e. melting a fusible material, which solidifies thereby contacting the confronting side surfaces and fixing the same against each other. Fixing in the meaning of the present application is to be specifically understood as permanently connecting two parts with each other. Nevertheless, the amount of fusible material, which could impede the taste of the liquid made by brewing or extracting the commodity contained within the pouch is greatly reduced, which is beneficial for ecological reasons and for the taste of the liquid. Further, permeation of water through the web material is only restricted at the joint in which the melt of the heat-sealable cord has been solidified. The melt thus formed preferably defines a weld seam between two layers of the web in order to permanently join those layers of the web. Thus, the pocket containing the brewable or extractable commodity is greatly open to water entering the pocket from outside and leaving the pocket to the outside.

According to a preferred embodiment of the present invention, the amount of heat-sealable cord for closing and sealing the pouch is further reduced. In this preferred embodiment, the web is provided as a continuous web, which facilitates economical manufacturing of multiple pouches as e.g. known from WO 2007/089838 A2. As further known from this prior art, the web is folded to provide the confronting side surfaces joined along a bottom edge. This bottom edge may be defined by a gusset. In such gusset the bottom edge may be arranged above a bottom end of the pouch and/or bottom fold of the gusset. Accordingly, in a cross-sectional view of the pouch manufactured according to this preferred embodiment, the confronting side surfaces may each have a double layer bottom section and a single layer top section. As the continuous web is folded to provide the bottom edge, at least one edge is closed without fusing. According to the preferred embodiment, however, the heat-sealable cord interfuses only a leading, a trailing and a top edge of a lengthwise piece of the web adapted to form the pouch. Referral to the capability of the lengthwise piece to form the leading, the trailing and the top edge aims to stress the effect that the heat-sealable material may be arranged on the web prior to folding and/or cutting of the web material. In other words. the heat-sealable cord may be arranged on a continuous single layer web, which will be folded thereafter and which is continuously conveyed for processing the same into pouches. In such a constitution, the continuous web does not yet have any leading, trailing or top edges, but only positions adapted to form respective edges. In the pouch readily made by the inventive method, the top edge is arranged opposite to the bottom edge and usually extends parallel thereto. The vertical edges extend between the top edge and the bottom edge. For facilitating the method for making the pouches, the vertical edges, i.e. the trailing and leading edges of a continuous web being processed to form the pouches, will extend essentially perpendicular to the bottom and the top edge, respectively, and parallel to each other.

In the description of the present invention, reference is made to the feature "vertical seal". This vertical seal is a seal which is provided at predetermined distances along the longitudinal axis of the folded web. The vertical seal is usually arranged in a vertical direction upon filling of the pocket defined by confronting side surfaces as the top edge is still unsealed, i.e. the pouch is an open pouch. The feature "vertical seal" does not specify the orientation of the continuous web when the vertical seals are made. When making the vertical seals, the continuous web can have any orientation.

According to a further preferred embodiment of the inventive method, the leading and the trailing vertical edges are sealed to form open pockets. Those open pockets are filled through an opening arranged at the top edge. Thereafter, the top edge is sealed by the top seal and, hence, the commodity is fully enclosed in the closed pouch. In this preferred embodiment, the sealing of the pocket is effected usually by a single heat-sealable cord arranged adjacent to or on the location of the leading and trailing vertical edge and the top edge, respectively. However, this single heat-sealable cord is not heated to provide a melt over its entire length at a single instance. Instead, the vertical segments of the heat-sealable cord are first fused to provide a melt thereby making the vertical seals while the top seal is made in a subsequent step and after filling the open pouch. The open pockets may already have been separated from the web e.g. by cutting. However, the open pockets may form part of a continuous web, i.e. be contained in a pouch train with multiple open pockets arranged next to each other with one or more vertical seals between adjacent open pockets.

In order to secure the heat-sealable cord temporarily to the web, in particular, in case the web is folded after arranging the heat-sealable cord on the web, it is preferred to tack the heat-sealable cord to a section of the web corresponding to a section of the web defining one of the confronting side surfaces and before folding. With this preferred embodiment of the present invention, the heat-sealable cord can be arranged relative to the web in a predetermined pattern, which pattern remains secured by tacking the heat-sealable cord. Tacking is in particular effected by partially welding a spot and/or a quite short length of the heat-sealable cord to the web. In other words, tacking according to this preferred embodiment is usually not effected to join confronting side surfaces of the web, but only to secure the heat-sealable cord in the predetermined pattern. As a result of tacking, a connection between the tack cord and the web is provided which is releasable without destroying the tack cord and/or the web. Final fusing of the heat-sealable cord over the entire length or at least segments of the entire length extending parallel to the leading or trailing edge or the top edge is effected after tacking in a predetermined manner. Accordingly, the seal between the confronting surfaces extends as predetermined with the pattern of the heat-sealable cord. Affixing can be attained by any suitable way, in particular by locally heating and thereby fusing the heat-sealable cord to locally secure the same to the web. On a general basis, the tacking of the heat-sealable cord is attained in a corner section, in which two segments running parallel to their respective edge intersect. The section of the web may correspond to a single side wall of the pouch. Accordingly, folding of another segment may provide the confronting side surfaces, between which the pocket is formed.

According to a preferred embodiment, which facilitates handling of the heat-sealable cord and arrangement thereof relative to the web, the heat-sealable cord is arranged at an outer side of a section of the web defining one of the confronting side surfaces. Accordingly and after folding, the heat-sealable cord is provided on the outer side of the folded web. However, the heat-sealable cord is usually arranged only on one of the outer sides of the folded web. After folding, the melt formed by fusing the heat-sealable cord is pressed to interfuse the web for forming the confronting side surfaces. In case of a gusset the confronting side surfaces include the at least four layers forming the gusset. In other words, the melt provided by fusing the hot-sealable cord is pressed from an outer side of the folded web to an inner side to seal confronting surfaces. In case of a gusset the two outer layers and the two other layers are joined which usually form the gusset. The gusset is usually formed from an inward projection of the base of the pouch. In other words, the gusset preferably is an inwardly folded gusset. Preferably and after sealing the layers forming the gusset, inner layers of the gusset are separated from each other to provide an unfoldable gusset and thereby increasing the volume of the pouch adapted to receive the commodity. Unfolding of those inner layers can be attained by mechanically forcing those inner layers away from each other as the melt formed by fusing the heat-sealable cord has not fully cooled down to room temperature and is still viscoplastic.

According to a further preferred embodiment of the present invention, the heat-sealable cord is laid on an outer circumferential surface of a drum in a predetermined pattern and around holding pins projecting the outer circumferential surface to define this pattern. In this preferred method, the heat-sealable cord is usually laid on the outer circumferential surface of a drum in a fashion in which the heat-sealable cord encircles the holding pins but does not necessarily contact the same. In the preferred embodiment, the drum is usually rotated, while an arm delivering heat-sealable cord to the drum is rotated such that the forward end of the arm delivering the heat-sealable cord describes a figure of 8. As the drum preferably rotates continuously around its central axis, the heat-sealable cord is tensioned around the holding pins to assume a pattern with segments of the cord of straight orientation between neighboring holding pins.

According to a preferred embodiment of the inventive method, the web is laid on the outer circumference of the drum and on top of the predetermined pattern of the heat-sealable cord. Thus, the heat-sealable cord is arranged between the outer circumferential surface and the web. As the web is laid on the outer circumferential surface of the drum, the holding pins are preferably retracted. Thus, the web will not be pierced by the holding pins. Instead, a radial tension between the web and the outer circumferential surface will secure the pattern of the heat-sealable cord. The holding pins will be retracted at the same time the web is laid against the outer circumferential surface of the drum thereby pressing the heat-sealable cord against this surface.

According to a further preferred embodiment of the invention, the following sequence of method steps is conducted: first, a tag is placed on the drum. This tag usually made of paper or card and may be printed for identifying the commodity received within the pouch. Most preferably, the tag is adapted for handling the pouch as generally known for teabags and is in the final pouch connected with the web defining the pocket receiving the commodity. As a next step, a tag cord is laid on the outer circumferential surface of the drum in a tag pattern. This tag pattern is arranged such that the tag cord extends over the tag. Accordingly, a certain length of the tag cord overlays the tag. Then, the heat-sealable cord is laid on the outer circumferential surface of the drum in the predetermined pattern. Accordingly, in the preferred embodiment of the present invention, two separate cords are provided, one of which being the heat-sealable cord, the other being the tag cord. The tag cord does not have to be formed of or comprise a heat-sealable material. Preferably, the tag cord is made of a fusible material. After the two cords have been arranged in the respective patterns, the web is laid on the drum and at least locally fixed to the heat-sealable cord. Additionally, the tag cord may be tacked and/or permanently fixed to the web. Tacking in the meaning of the present invention is to define a connection between the tag cord and the web which is releasable without destroying the tag cord and/or web. Tacking is to provide a predetermined positioning of the tag cord relative to the web of the usable length of the tag cord, which usable length can be released by the user of the pouch, in particular in case the pouch defines a tea bag. The term "fixing" in connection with the tag cord shall in particular be understood—as a permanent connection between the tag cord and the web such that the pouch can be handled hanging on the tag cord. Sections of the tag cord tacked to the web are releasably secured to the web while a fixed cord is permanently fixed to the web, i.e. the connection cannot be removed without destroying the tag cord and/or the web. On a regular basis, and as the tag cord is preferably made of a fusible material, tacking of the tag cord to the web is effected under welding conditions, which are different from the welding conditions applied for fixing the tag cord to the web. On a regular basis, one end of the tag cord assigned to a lengthwise piece corresponding to a pouch is fixed to the web while the other end of respective tag cord lengthwise piece is fixed to the tag. A mid-section of the tag cord extending between the one end of the tag cord being fixed to the web and another end fixed to the tag is tacked to the web. In a next step, the web is folded. Then, the heat-sealable cord is heated to make a welded joint between the confronting side surfaces, which may include sealing of the layers forming the gusset.

As a result of this last welding step, the leading and trailing vertical seals are prepared, while a segment of the heat-sealable cord finally forming the top seal remains unfused. Thus, the pocket is still open. The pocket forms part of a pouch train, in which multiple open pockets are arranged next to each other and in longitudinal direction of the web. Those pockets may be isolated by cutting the pouch train into separate pouches, which separate pouches may be transferred to a filler wheel as e.g. described in WO 2007/089838 A2, U.S. Pat. No. 4,534,158 A or JP 11/292001 1. Alternatively, the pouch train may be arranged at the outer circumference of a filler wheel as e.g. described in U.S. Pat. No. 3,563,001 A, U.S. Pat. No. 5,502,951 A, U.S. Pat. No. 3,597,898 A, CA 2 142 480 A or U.S. Pat. No. 6,058,818 A for filling the pockets.

Regarding the filling of separated individual pouches or the filling of pouch train, the disclosure of the aforementioned prior art is incorporated herein by reference.

After filling of the individual pouches or the pockets of the pouch train, the top seal is provided by fusing one or more segments arranged adjacent to the top edge of the pouches or pockets of the pouch train. In case of a pouch train, the filled pockets may be cut before or after sealing the top edge to thereby provide individual pouches.

According to a preferred embodiment of the present embodiment, the tag is folded to include a predetermined fixing length of the tag cord. The tag cord is preferably joined to the confronting tag surfaces by an adhesive applied to at least one of those confronting tag surfaces. Respective adhesive preferably is a coating of the confronting tag surfaces with a thermoplastic like PE. Thus, the fixing length of the tag cord will be included and fixed to the tag and thereby securely connected to the tag cord by applying heat (welding).

According to a further preferred embodiment, the tag is secured to the top edge of the pocket. Preferably, a segment of the heat-sealable cord arranged adjacent to the top edge of the pocket is tacked to removably attach the tag to the web forming the pocket. Such tacking of the tag is usually attained after folding of the tag and before folding of the web. Further, a mid-section of the tag cord is preferably tacked to the web at a position corresponding to an outer face of the pouch. Usually, this mid-section is arranged such that after folding and cutting to separate the pouch the mid-section slightly projects the bottom of the final pouch. On a general basis, the mid-section is arranged such that a leading segment of the tag cord extends from a corner portion between the leading edge and the top edge of the pouch to the bottom segment thereof and then turns to extend from said bottom segment in a straight line to the tag.

Most preferably, the tag cord is laid on the drum in a V-shaped pattern for each lengthwise piece of the web corresponding to a single pouch. The V-shaped pattern is secured by three tag cord holding pins, which are preferably movably held on the drum to be retracted as the web is placed on the drum. In the preferred embodiment, the web is placed on the drum such that a mid-section of the web in width direction thereof is arranged at a position corresponding to the location of a bottom tag cord holding pin and the two other tag cord holding pins are arranged alongside of the web. One of the two other tag cord holding pins is a leading holding pin for a lengthwise piece corresponding to the pouch to be formed while the other of the two other tag cord holding pins defines a trailing holding pin assigned to a trailing edge of respective lengthwise piece. In other words, the tag cord is provided in a repeating V-shaped pattern around respective pins. Specifically, the tag cord is exclusively arranged in a V-shaped pattern on the outer circumferential surface of the drum, wherein each V-shaped pattern is followed by the next V-shaped pattern and wherein each V-shaped pattern is assigned to a lengthwise piece corresponding to a pocket or a final pouch.

In this constitution, each of the two other cord holding pins is usually arranged essentially level with a separation between two adjacent lengthwise pieces of the web defining individual pouches.

According to a further preferred embodiment, the tag cord is provided as a continuous cord and is cut after having been fixed to the web and the tag. Cutting is performed preferably adjacent to the each other tag cord holding pin. Preferably, a disposable lengthwise piece is cut away, which disposable lengthwise piece extends between the tag and an edge of the web corresponding to the upper edge. The disposable lengthwise piece is usually cut before folding the web. Specifically, the disposable lengthwise piece extends from the tag over the other cord holding pin and from there toward the web and usually extends straight towards the position corresponding to the bottom segment of the pouch. As a result of this cutting of the disposable lengthwise piece of the tag cord, respective tag cord is minimal, if not overhanging from the tag and/or the upper edge of the pouch.

With a separate aspect, the present invention provides a pouch, in particular containing a brewable or extractable commodity such as tea. The pouch has a pocket defined between confronting side surfaces of a web. As a solution to the above objective, the confronting side surfaces of the web are joined by solidified melt of a heat-sealable cord arranged in vicinity of at least one edge of the pouch. As already mentioned above, the confronting side surfaces are preferably joined along a folded bottom, wherein the top edge arranged opposite to the bottom edge and vertical edges extending between the bottom and the top edge are joined by the solidified melt. Accordingly, the bottom edge is provided by folding and not joining, i.e. melting of the heat-sealable cord.

According to a preferred embodiment of the present invention, the pouch has a tag cord. One end of said tag cord is joined to the web. The other end of the tag cord is fixed to the tag which in turn is tacked to the top edge of the pouch. A mid-section of the cord, which extends between the one end and the tag is tacked to an outer face of the pouch. According to this preferred embodiment, the mid section of the tag cord is only tacked and not permanently fixed to the web. Accordingly, the tag cord can be separated from the web for handling the pouch. Most preferably, the tag is tacked to the top edge of the pouch using a segment of the heat-sealable cord that will also form the top seal. As for the tag cord, securing to the web is such that the mid-section and the web can be removed manually without destroying the web material and/or the sealed pouch.

BRIEF DESCRIPTION OF THE DRAWINGS

Further features, details and advantages of the present invention will become apparent from the following description of a specific embodiment in combination with the drawing. In the drawing.

DETAILED DESCRIPTION OF THE INVENTION

Figure 1:
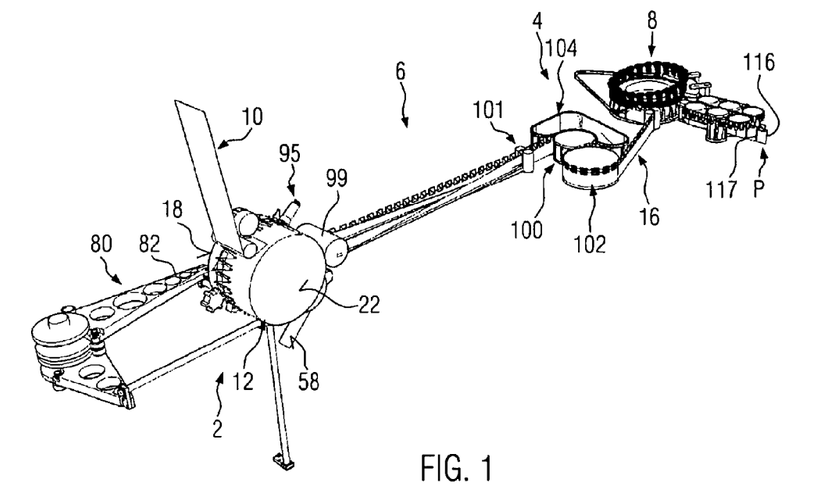
FIG. 1 a perspective view of the essential components of an apparatus suitable for conducting the inventive method and making an example of the inventive pouch.

FIG. 1 shows an embodiment of an apparatus suitable for conducting the inventive method. This apparatus comprises a web preparation module 2, a vertical sealer module 4, a folding module 6 arranged between the web preparation module 2 and the vertical sealer module 4 and a filler module 8 arranged behind the vertical sealer module 4 in the travelling direction of a web.

This web is fed to the web preparation module 2 as a continuous, unfolded web 10, the central part thereof being formed by a drum 12, which is rotatably driven in clockwise direction when viewed in accordance with the representation of FIG. 1. The flat projection of an outer circumferential surface 14 of the drum 12 as depicted in FIG. 2 to elucidate the essential steps of preparing the unfolded web 10 prior to folding in the folding module 6.

Figure 2:
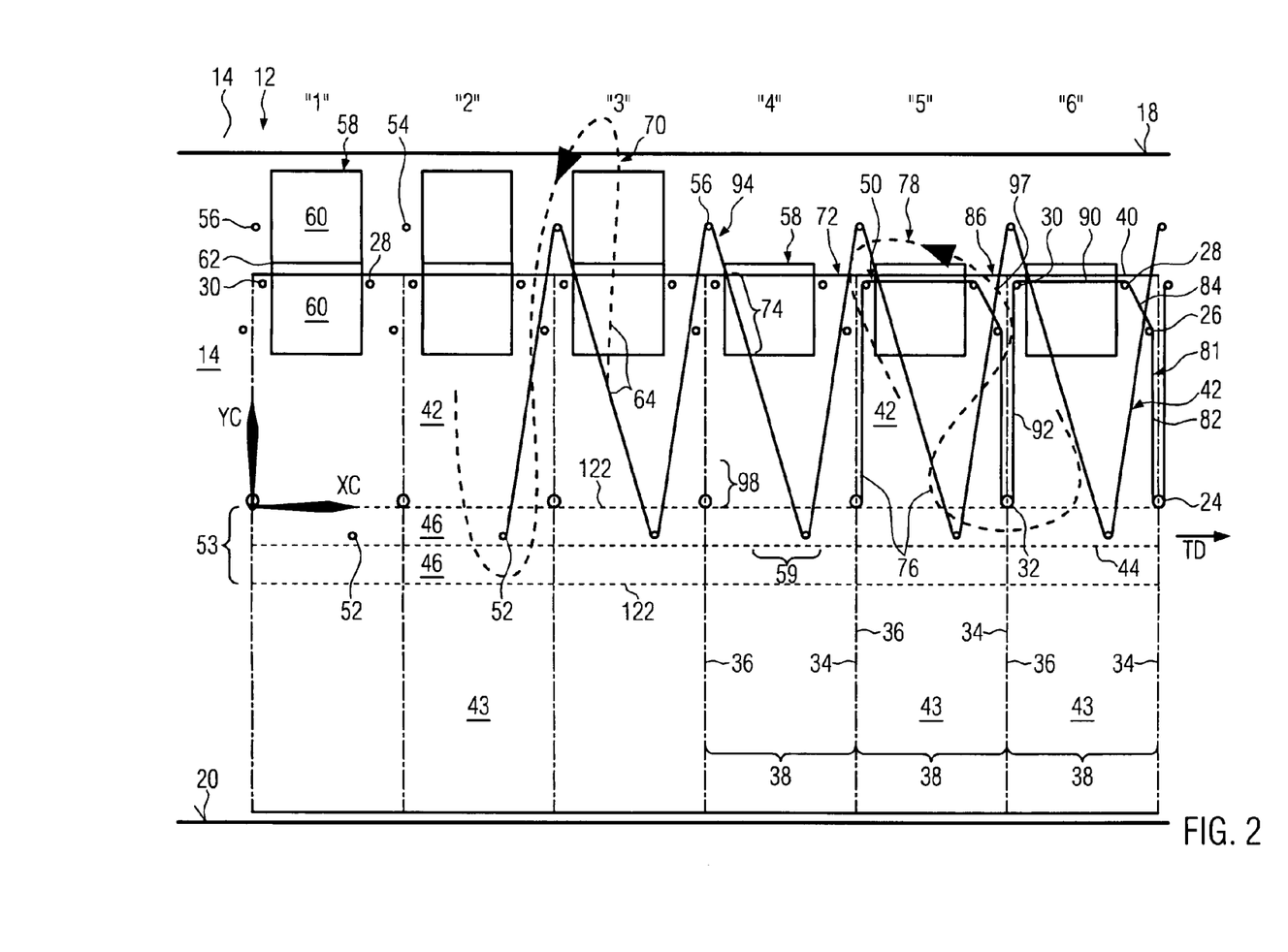
FIG. 2a a flat projection of the drum for preparing the web of the embodiment depicted in FIG. 1.
FIG. 2b a flat projection of further stations provided in circumferential direction on the drum for preparing the web of the embodiment depicted in FIG. 1.
Figure 2B:
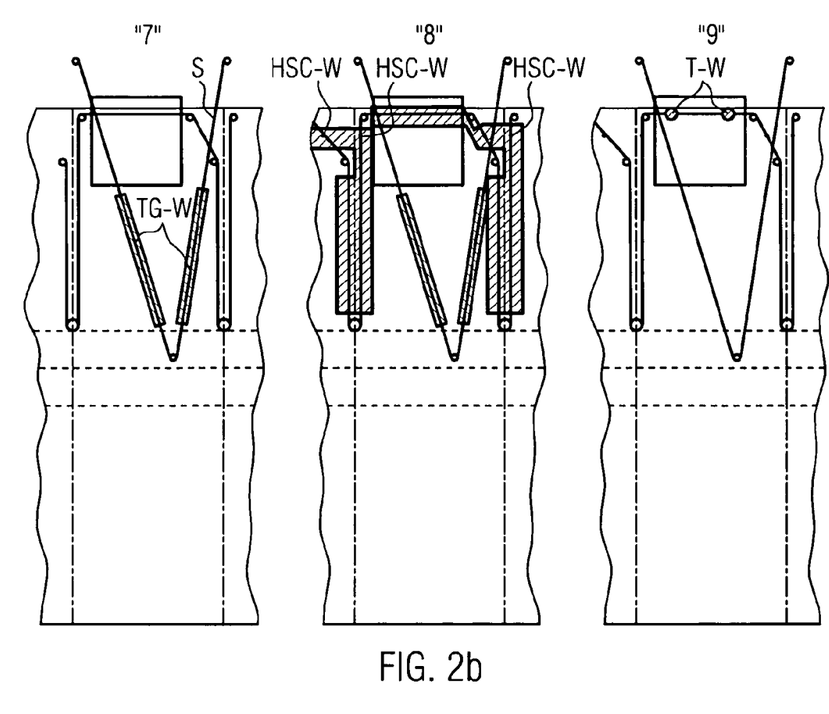

In FIG. 2, dotted lines identify various stations of pouches to be formed, which pouches are made by cutting a pouch train identified with reference numeral 16 in FIG. 1. It should, however, be noted that the dotted lines do not reflect the presence of the web 10 in the various stations of FIG. 2, as in those stations, the web has not yet been placed on the outer circumferential surface 14 of the drum 12. However, referral will be made to these dotted lines to identify elements and sections of the web forming a single pouch and/or to identify elements and sections of the pouch.

As this drum 12 is rotatably driven, the drum 12 passes various stations identified with numbers 1-6 in FIG. 2. Just below the numbers 1-6, a straight line is identified with reference numeral 18 corresponding to the flat projection of the rear end surface of the drum as seen in FIG. 1. A further parallel line identified with reference numeral 20 is the flat projection of a front end surface of the drum, which front end surface is identified with reference numeral 22 in FIG. 1. Between those end surfaces 18, 20, the drum 12 forms the outer circumferential surface 14. In stations 1-6, holding pins 24, 26, 28, 30, 52, 56 are projecting the outer circumferential surface 16. Those holding pins 24, 26, 28, 30, 52 are movably held by the drum and can be projected over the outer circumferential surface 14 in a projected position and retracted to be essentially received within the drum 12 to not project the outer circumferential surface 14 thereof.

Reference numeral 24 identifies a leading bottom holding pin, which is arranged at a position corresponding to a leading separation 34 of the web 10. Reference numeral 32 identifies a trailing bottom holding pin arranged at a trailing separation 36 of an identical lengthwise piece 38 of the web 10, which trailing bottom holding pin 32 is the leading bottom holding pin of the next lengthwise piece 38 of lengthwise pieces defining pockets within the pouch train 16.

Slightly inward of the leading separation 34 and within the lengthwise piece 38 having said leading separation 34, there is provided a leading top holding pin 26. This leading top holding pin 26 is arranged at a distance from a top edge 40 of the web 10. In FIG. 2, each lengthwise piece 38 in width direction thereof comprises upper and lower confronting side surface sections 42, 43 separated by a folded bottom edge 44. Between the folded bottom edge and each confronting side surface section 42, 43 there is provided an inner layer section 46, which is adapted to form a gusset depicted with reference numeral 48 in FIG. 4.

In width direction, the leading top holding pin 26 is arranged distant from the top edge 40 corresponding to 15% of the extension between the bottom edge 44 and the top edge 40. Remote in lengthwise direction of the web 10, i.e. in rotational direction of the drum 12 and directly adjacent to the top edge 40, there is provided a leading top edge holding pin identified with reference numeral 30. Level with this leading top holding pin 26 and slightly inward of the trailing separation 36 at a trailing corner portion 50 of the lengthwise piece 38, there is provided a trailing top holding pin 30. The distance in width direction of this trailing top holding pin 30 to the top edge 40 is identical to the distance of the top edge holding pin 28 to this top edge 40. Finally, and assigned to each lengthwise piece 38, there is provided the trailing bottom holding pin 32.

Further, the outer circumferential surface 14 of the drum 12 is projected by tag cord holding pins identified with reference numeral 52, 54 and 56. To each lengthwise piece 38, there is assigned a bottom tag cord holding pin 52 arranged at a position corresponding to an inner layer 46 assigned to the top confronting side surface section 42. This bottom tag cord holding pin 52 is arranged in a mid-section 53 of the lengthwise piece 38 in width-direction of the unfolded web 10 and slightly shifted toward the leading separation 34 relative to the center of the lengthwise piece 38 in longitudinal direction of the web 10. Essentially level with the leading separation 34 and above the top edge 40, i.e. at a location alongside the web 10, there is provided a leading tag cord holding pin 54. Level with said leading tag cord holding pin 54 in width direction of the web 10, i.e. in axial direction of the drum 12, there is provided a trailing tag cord holding pin 56. This trailing tag cord holding pin 56 forms the leading tag cord holding pin of the next lengthwise piece 38 in travelling direction TD of the continuous web 10. Every tag cord holding pin 52, 54, 56 is movably held to either project the outer circumferential surface 14 of the drum 12 or be at least level with said surface 14 and held in a retracted position.

In station 1 of FIG. 2 and cut from a strip by a cutting wheel 57 (cf. Fig.), a tag 58 is placed on the outer circumferential surface 14 by a pressing drum 57a. This tag 58 has a longitudinal extension in axial direction of the drum 12 and defines confronting tag surfaces 60 separated by a tag folding line 62 extending parallel to the longitudinal direction of the web. The tag 58 has a length, i.e. extension in the longitudinal direction of the unfolded web 10 adapted to fit between the top edge holding pin 28 and the trailing top holding pin 30 (cf. station 1 in FIG. 2).

In the next station, a tag cord 64 is arranged on the outer circumferential surface of the drum 12. This tag cord 64 is held by a track cord feeder 66 having a movable arm 68 controlled to provide a movement corresponding to a figure of 8 (cf. FIG. 1). Thus, two closed loops are formed by the continuous movement of the movable arm 68. With said movement, the tag cord 64 is applied to the outer circumferential surface 14 of the drum 12 and in a tag loop identified with reference numeral 70 in FIG. 2 at station 2. As the drum 12 is rotating while the movable arm 68 makes a double encircled movement, the tag cord 64 is laid around the tag cord holding pins 52, 54, 56 to encircle those pins 52, 54, 56. As a result of the rotational movement of the drum 12 and an appropriate holding force for holding the tag cord 64 applied by the movable arm 68 while feeding this cord 64 continuously to the drum 12, the tag cord 64 is straightened to extend in straight lines between the tag cord holding pins 52, 54, 56. As depicted for station 3 in FIG. 2, respective pattern of the tag cord 64 is a V-shaped pattern 72. This V-shaped pattern 72 is designed such that a fixing length 74 extends over the lower confronting tag surface 60 and intersects essentially with the tag folding line 62 at a trailing edge of the tag 58 (see station 3 of FIG. 3). A mid-section 59 of the tag cord 64, i.e. a bottom section of the V-shaped pattern 72 wound around the bottom tag holding pin 52 is arranged at a position corresponding to the inner layer section 46 of the web 10. Further, and as derivable from graphical information provided for stations 2 and 3, the tag cord 64 is arranged to extend between the top edge holding pin 28 and the leading top holding pin 26. For the sake of arranging the tag cord 64 in a straight line between the bottom tag cord holding pin 52 and the leading or trailing tag cord holding pin 54, 56, the leading top holding pin 26 has been arranged downwards and away from the top edge 40 and furthermore provides a fairly wide gap for extending the tag cord 64 between holding pin 52 and holding pin 54.

As derivable from the sequence from station 3 to 4 in FIG. 2, the tag 58 is folded such that the confronting tag surfaces 16 are laid on top of each other with the fixing length 74 in between. At least one of the confronting tag surfaces 60 is coated with a PP- or PE-coating, which will be heated and thereby seal the confronting side surfaces against each other and join the tag cord to the tag 58 upon heating. Heating of the tag cord and sealing of the tag 58 is effected at station 4 by a tag welding wheel 77.

Figure 1A:
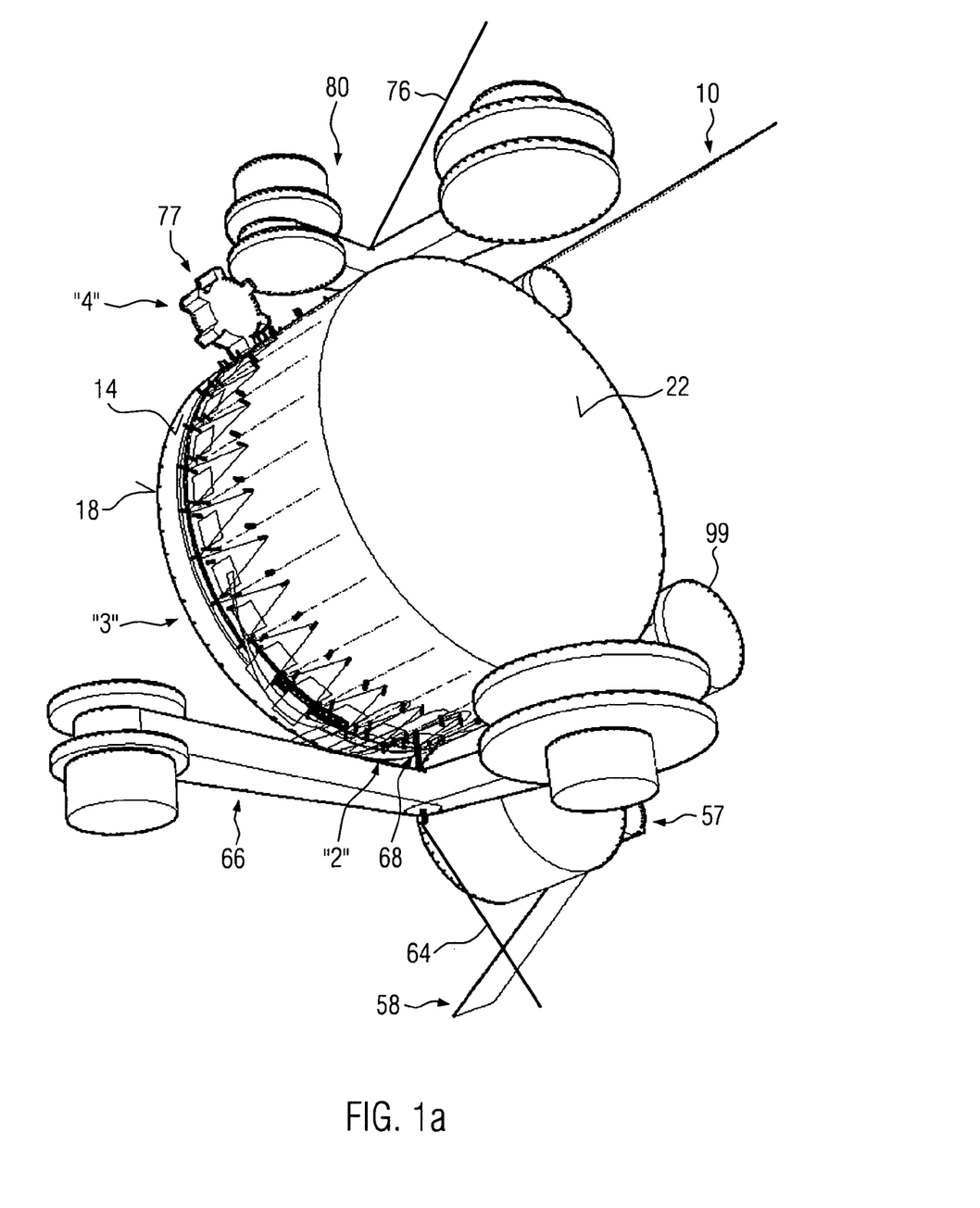
FIG. 1a a perspective side view of the drum.
Figure 1B:
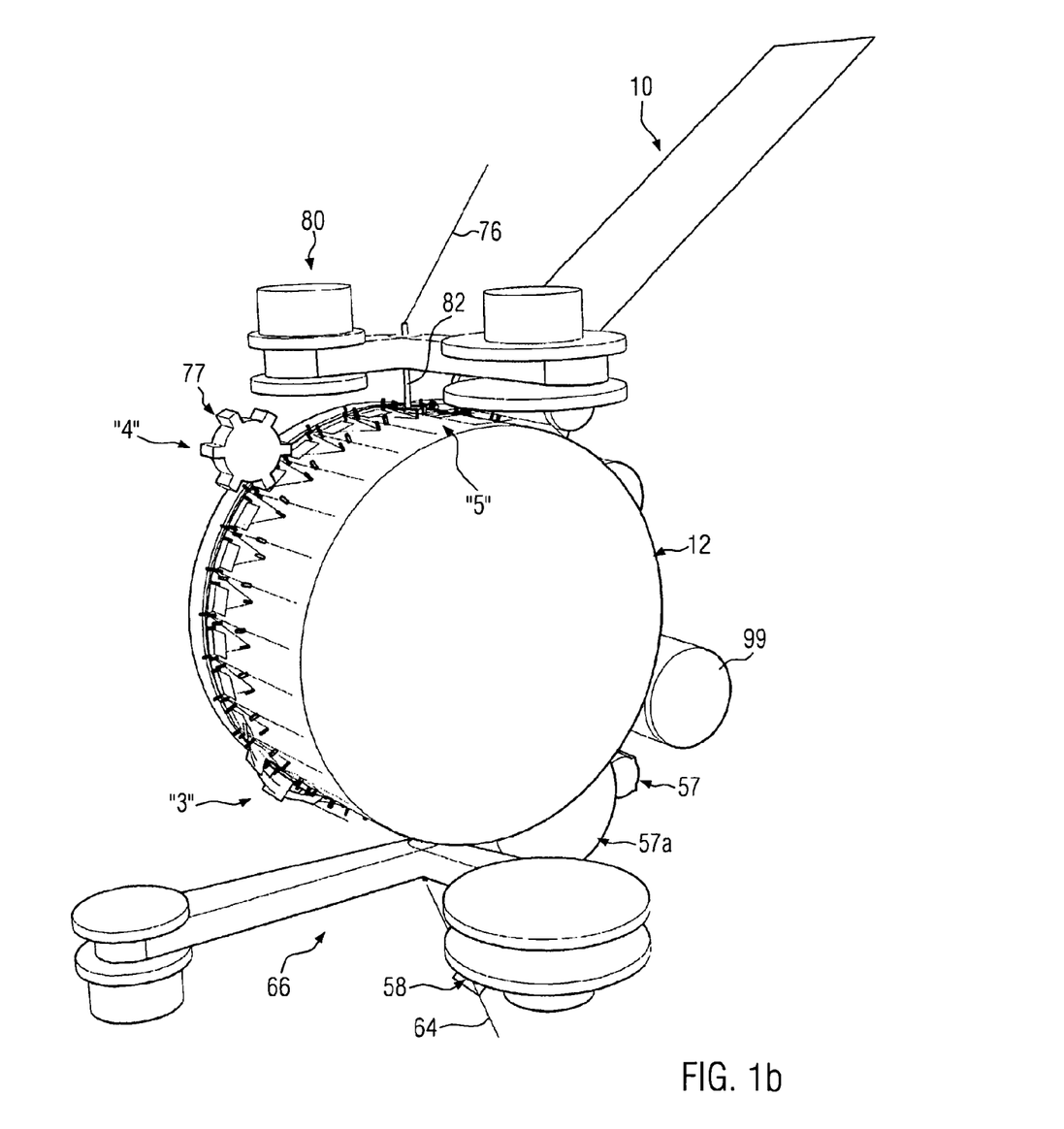
FIG. 1b another perspective side view of the drum.

In the next position, i.e. station 5 on the outer circumferential surface 14 of the drum 12, a heat-sealable cord 76 is laid around the holding pins 24, 26, 28, 30, 32 in a heat-sealable cord loop 78. For providing the heat-sealable cord 76 in such loop 78, a sealable cord feeder 80 is provided having a feeder arm 82 driven as already described with reference to the movable arm 68 of the tag cord feeder 66 (cf. FIGS. 1*a*, 1*b*). The heat-sealable cord loop 78 is straightened to provide a predetermined essentially U-shaped pattern 81 comprising a leading segment 82 extending parallel to the leading separation 34 directly adjacent thereto but with a slight distance away from this leading separation 34 toward the trailing separation 36. Between the leading top holding pin 26 and the top edge holding pin, the heat-sealable cord 76 provides an oblique segment 84 such, that a leading corner portion 86 of the lengthwise piece 38 is eliminated from being provided with a seal and defines an unsealed corner section. Between the top edge holding pin 28 and the trailing top holding pin 30, the heat-sealable cord 76 defines a top edge segment 90 which is adapted to run parallel to the top edge 40 with a slight distance thereto. Finally and between the trailing top holding pin 30 and the trailing bottom holding pin 32, the heat-sealable cord 76 defines a trailing segment 92 which runs parallel to the trailing separation 36 and is arranged directly adjacent thereto.

After the heat-sealable cord loop 78 is straightened to provide the segments mentioned above and defining the U-shaped pattern 81, the continuous web 10 is fed to the outer circumferential surface 14 of the drum 12 and wound around said outer circumferential surface 14 with an angle of approximately 90° (cf. FIG. 1). As the continuous web 10 contacts the outer circumferential surface 14 of the drum 12, the pins 52, 54, 56 and 24, 26, 28, 30, 32 are sequentially retracted such that the web 10 is not pierced by the pins 24 through 32; 52 through 56. By the radial pressure of the continuous web 10, the V-shaped pattern 72 of the tag cord 64 and the U-shaped pattern 81 of the heat-sealable cord 76 is pressed and thereby secured between the web 10 and the drum 12.

In a further station on the outer circumferential surface of the drum 12, a disposable lengthwise piece 94 of the tag cord 64 identified in FIG. 2, station 4 is removed by a remover 95 (cf. FIG. 1). This disposable lengthwise piece 94 projects the folded tag 58 and projects toward the trailing tag cord holding pin 56. Cutting is facilitated in case of a straight cutting line which extends parallel to the top edge 40 of the web 10 and/or the tag 58 essentially level with the upper edge of the folded tag 58.

Next and as the web 10 presses and thereby secures the pattern 72 and 81 between the web 10 and the outer circumferential surface 14 of the drum 12, the pattern 81 of the heat-sealable cord 76 is fixed to the upper confronting side surface section 42 by locally heating and, thus, partially melting the heat-sealable cord 76, which will be described hereinafter in further detail by referring to FIG. 2*a*.

FIG. 2*a* exemplifies stations "7", "8", "9", which stations are provided at the outer circumference of the drum 12 with circumferential distance thereon not necessarily corresponding to a lengthwise piece 38 adapted to provide a single pouch P. Said stations "7", "8", "9" are provided after the continuous web 10 has been applied to the drum 12. Stations 7 to 9 are to elucidate further welding steps applied on the drum 12. The first welding step is the welding at station 4 in FIG. 2 *a* for melting the PE coating of the tag 58 with a welding wheel pressing against the drum 12, which welding wheel is heated to approximately 160° C. This first welding step for welding the tag strap to the tag is to generally apply a uniform heat essentially to the entire surface of the folded tag 58 to melt the PE coating as well as the tag cord 64 between the confronting tag surfaces 60.

At station 7, the V-shaped pattern 72 of the tag cord 64 is tacked to the web 10 by tag cord-web-welds identified with TC-W. Optionally, a further TC-W-weld can be applied in the area of the leading corner section 86. By means of the two welds TC-W, the tag cord 64 is only secured to the web 10 and not completely melted. Specifically, the tag cord 64 is not heated in a mid-section 53 of the lengthwise piece. Further, and by an adhesive like a heat-sealable melt, the tag cord 64 is secured at end 97 to the unsealed corner section 86 at positions identified with S. Further, the mid-section 59 of the tag cord 64 is tacked to the upper confronting side surface section 42. As a consequence, the tag cord 64 is releasably secured to the web 10.

In a further station, identified as station 8, the heat-sealable cord 56 made of PA or PE is fixed to the web 10 by welds which are identified with reference numeral HSC-W. Those welds in form of tacks secure the U-shaped pattern 81 of the heat-sealable cord 76 and melt the entire heat-sealable cord 76 but omit the holding pins 24, 26, 28, 30, 32.

The application of the TC-W welds and the HSC-W tacks is effected by one or more heated drums having a temperature of 160° C. Stations 7 and 8 can be combined at a single position in circumferential direction of the drum 12.

Finally, in station 9, the tag 58 is tacked to the web 10 by local welds of the heat-sealable cord 76 identified with reference numeral T-W for station 9 in FIG. 2*a*. Those local weld spots T-W are such that the tag 58 can be removed from the web 10 without destroying the same. For welding the heat-sealable cord 76 to the tag 58, a heated welding drum is pressed against the folded tag 58 having a temperature of approximately 200° C.

Next, the continuous web leaves the drum 12, is guided around a pressing drum 99 pressing the web 10 against the drum and is folded in the folding module 6. In this course of such folding between folding rolls 101, the upper confronting side surface section 42 is laid against the lower confronting surface section 43 to provide confronting side surfaces 96 by means of guide elements (cf. FIG. 4). Further, the inner layer sections 46 are abutted against a bottom section 98 provided by the upper and lower confronting side surface sections 42, 43, respectively to provide the gusset 68 depicted in FIG. 4.

Figure 3:
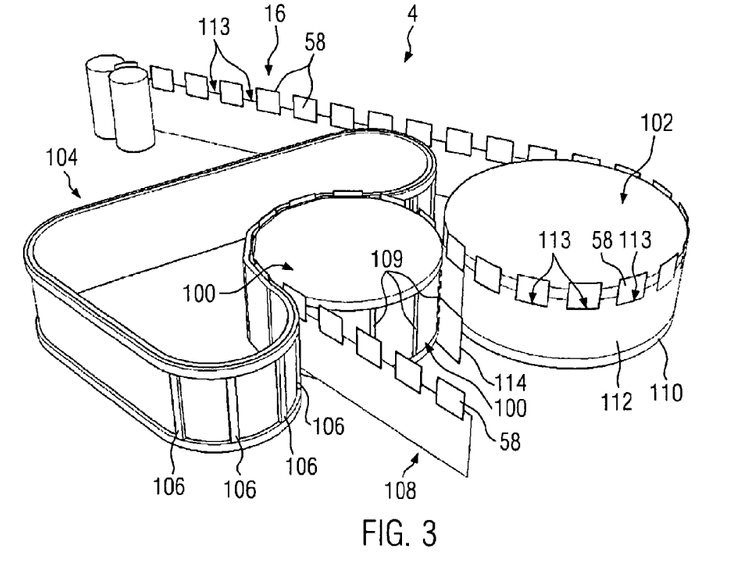
FIG. 3 a perspective view of a vertical sealer of the embodiment depicted in FIGS. 1 and 2.

Next, the heat-sealable cord 76 is melted to provide vertical seals in the vertical sealer module 4, which is shown in greater detail in FIG. 3.

The vertical sealer module 4 has a heated drum 100 heated to about 225° C. and a trailing drum 102, which are arranged with their rotational axis extending in vertical direction. Assigned to the heated drum 100 there is provided a pressing belt 104 defining vertical pressing elements 106. The pressing belt 104 is abutted against the heated drum 100 over a circumferential extension corresponding of about 160°. As a folded web 108 is fed to the vertical sealer module 4, the same is pressed between vertical spines 109 defining the outer circumferential surface of the heated drum 100 and the cooperating surface provided by the pressing elements 106 of the pressing belt 104. Thus, a leading vertical pressing element 106 is abutted against the leading segment 82 and some part of the oblique segment 84. A trailing pressing element 106 is abutted against the trailing segment 92 of identical lengthwise piece 38, which trailing pressing element 106 for said lengthwise piece 38 likewise forms the leading pressing element of the next lengthwise piece 38.

Figure 3A:
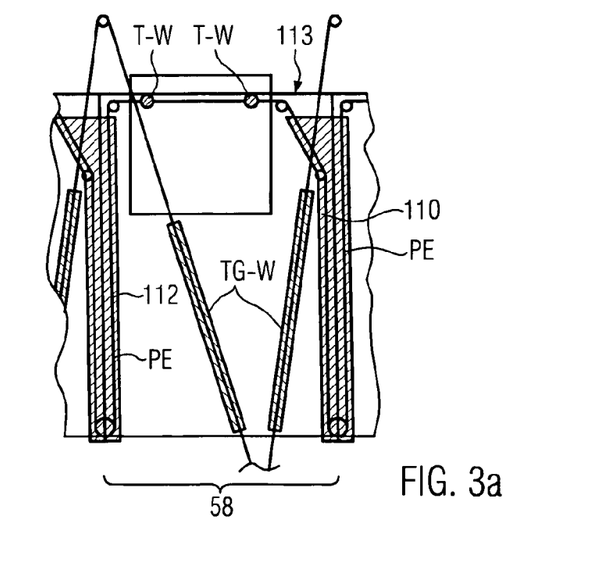
FIG. 3a a length section of the pouch train leaving the vertical sealer of FIG. 3.

The effective heating of each pressing element 106 is identified in FIG. 3*a* with PE. As a consequence, vertical seals are provided which are identified as leading vertical seals 110 and trailing vertical seals 112 in FIG. 3*a*. Thus, a leading vertical seal 110 and a trailing vertical seal 112 are provided defining a pocket 113 for each lengthwise piece 38 of the pouch train 16. For facilitating filling of the pocket 113, an upper end section of the trailing segment 92 near the top edge 40 may not be sealed. This upper end section has a length in width direction of approximately 5% of the overall extension of the folded web in width direction. As derivable from FIG. 3*a*, a portion of the oblique segment 84 defines the leading vertical seal 110 while an end section of the oblique segment 84 remains unsealed in the vertical sealer module 4.

Figure 4:
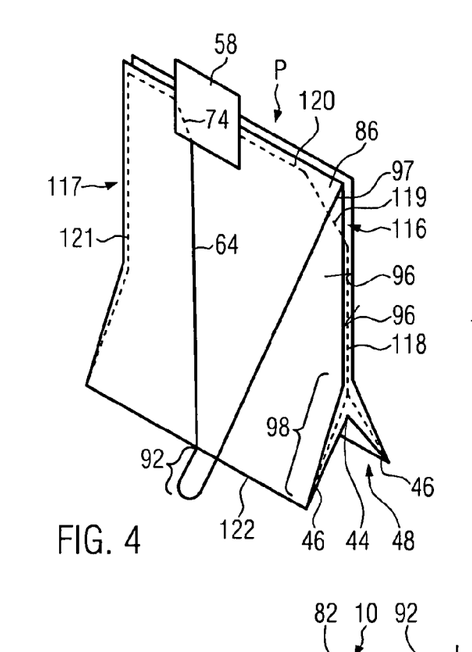
FIG. 4 a side view of an embodiment of the inventive pouch made in an apparatus of FIGS. 1 to 3 in accordance with FIG. 4 from the opposite side.

Between the heated drum 100 and the trailing drum 102 a longitudinal separation element 114 is introduced into the gusset 28 to separate the inner sections 46 from each other and to provide a V-shaped constitution at the bottom of each lengthwise piece 36 (cf. FIG. 4). As a consequence of heating and pressing, the folded web 108 between the heated drum 100 and the pressing belt 104, material forming the heat-sealable cord 76 is completely melted. The molten thermoplastic material interfuses the filter material forming the web 10 and, hence, joins the confronting side surfaces 96 against each other and against the inner layer sections 46.

The pouch train 16 is the fed to the filler module 8 which can have a conventional constitution with spouts of a spout wheel being introduced into the pockets 113 to fill the same with the material defining the commodity, in the present example tea. Then, the top edge 40 is sealed by heating the remaining upper section the oblique segment 84, the top edge segment 90 of optionally the upper end section of the trailing segment 92, each of which left unwelded in the vertical sealer module 4 and pressing the confronting side surfaces 60 against each other make the melt formed by the heat-sealable cord 76 at the top edge 40 interfuse the confronting side surfaces 96 (cf. FIG. 4) and join the same at the top edge 40 to seal and close the entire pocket 113. Next, the lengthwise pieces 38 forming the pockets 113 may be cut at the leading and the trailing separation 34, 36, respectively to provide individual pouches P. Top sealing of the pockets and/or cutting of the pouch train 16 may either be done at the circumferential surface of a filler wheel of the filler module 8 holding the pouch train 16 as the spouts are introduced into the pockets 113 or after discharging the pouch train 16 from the filler wheel.

The result of those manufacturing steps for making the pouch P is exemplified in FIG. 4 showing a perspective side view of the pouch P. Cutting of the pouch P from the pouch train 16 leads to leading and trailing edges identified with reference numeral 116, 117, respectively. At the trailing edge 116, the weld or melt provided the leading segment 82 of the heat-sealable cord 76 has provided a leading seal 118. Above said leading seal 118 the unsealed corner section 86 remains unsealed with an oblique seal 119 underlying this unsealed corner section 86 and connecting the leading seal 118 with a top edge seal 120. Alternatively, an end section defining the fixed end 97 of the tag cord 64 may join the confronting side surfaces at the leading corner section 86 as a consequence of the welding or melting effected by PE (cp. FIG. 3*a*). This top edge seal 120 intersects with a trailing seal 121, which extends parallel to the trailing edge 117. The inner layer sections 46 are folded away thereby providing the gusset 48. Accordingly, tea provided in a bottom region of the pouch P is received in two joined chambers formed by the gusset 48 in which the folded bottom seal 44 is arranged and folded inwardly.

The folded tag 58 projects the top edge of the pouch P. The tag cord 64 is fixed to the folded web 108 at the unsealed corner portion 86. The other end of the tag cord 64 is fixed to the tag 58. The mid-section 59 of the tag cord 64 is not fixed to the web and projects the bottom fold 122 of the pouch P. A line corresponding to the bottom fold is identified in FIG. 2 with reference number 122. Hence, the tag cord 64 may either be removed by tearing off the tag 58 and thereby removing the tag cord 64 from the web, or by gripping the projection formed by the tag cord 64 at the bottom fold 122 and tearing off the tag cord 64 from this position.

Figure 5:
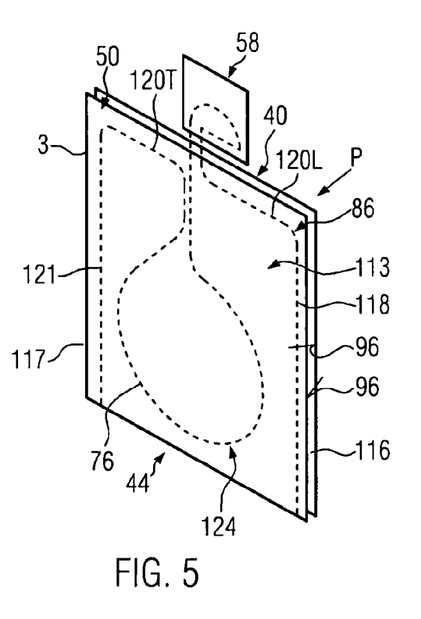
FIG. 5 a top view of a predetermined length of a web suitable for forming a second embodiment of the inventive pouch.
Figure 6:
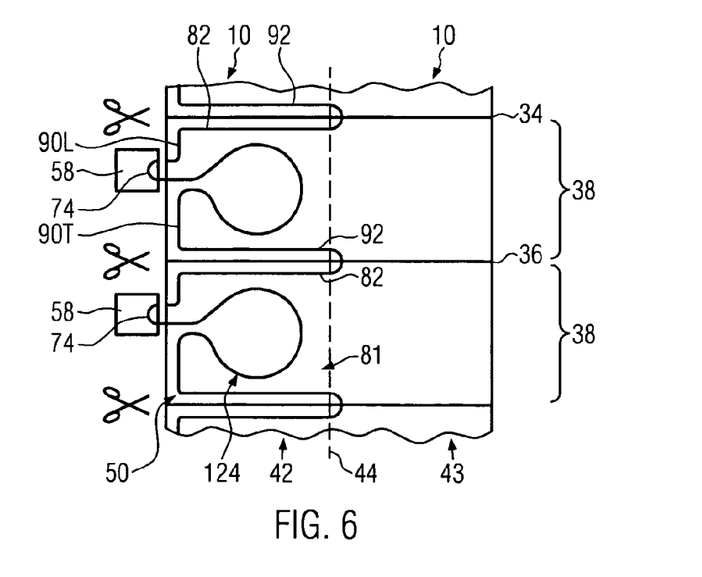
FIG. 6 a perspective side view of the second embodiment of the pouch.

FIGS. 5 and 6 are to illustrate a second embodiment of a pouch P and the manufacturing thereof. Identical elements as already described for the first embodiment and in connection with FIGS. 1 to 4 are used to identify respective elements in FIGS. 5 and 6.

The production of the pouch P may likewise utilize a drum for preparing a continuous web 10 conveyed in traveling direction TD. In the embodiment of FIGS. 5 and 6, a single cord is used, which is a heat-sealable cord having an unsealable cord core being provided with a fusible coating of e.g. a polymer. The heat-sealable cord 76 is continuously fed to the web 10 and usually around holding pins to provide a pattern 81 depicted in FIG. 5. Respective pattern 81 comprises a leading segment 82, a leading top edge segment 90L which is projected over the top edge 40 to provide a fixing length 74 extending over the tag 58 which fixing length 74 may be enclosed between two confronting tag surfaces as discussed above. The heat-sealable cord 76 is fed below the top edge 40 and on top of the upper confronting side surface section 42 to define an inner loop 124. From this inner loop 124, the heat-sealable cord 76 is provided in the pattern 81 so as to provide a trailing top edge segment 90T, which at the trailing corner portion 50 intersects with the trailing segment 92. The heat-sealable cord 76 is laid as a continuous cord in respective pattern 81 for each lengthwise piece 38. As opposed to the first embodiment, the heat-sealable cord 76 is placed on the web 10, which has been arranged on the drum 12. Thereafter, a disposable lengthwise piece 94 already removed in the graphical representation of FIG. 5 is cut away between the top edge 40 and the tag 58, which disposable lengthwise piece 94 is assigned to the trailing top edge segment 90T. Then, the confronting side surface sections 42, 43 are folded along a folding line corresponding to the bottom edge 44. Thereafter, heat is applied to the segments 82, 92 to provide open pockets, which may be filled thereafter as the pouch train 16 is abutted against a filler wheel as known from prior art. Then, the open pocket 130 is sealed by heating the segments 90T and 90L of the heat-sealable cord 76. In the course of this heating, the thermoplastic coating on the cord material is melted to fuse the confronting side surface 96 (see FIG. 6). Finally, the closed pockets are separated from the pouch train 16 to provide individualized pouches P.

Respective pouch P is depicted in FIG. 6. In said pouch P the tag 58 is held distant from the upper edge 40 by the heat-sealable cord 76. For handling the pouch P, the inner loop 124 is drawn out of the pocket 113 defined by the pouch P to provide external length between the pocket 113 and the tag 58.

REFERENCES IN THE DRAWINGS INCLUDE 2 web preparation module;
4 vertical sealer module;
6 folding module;
8 filler module;
10 continuous unfolded web;
12 drum;
14 outer circumferential surface;
16 pouch train;
18 flat projection rear end surface;
20 flat projection front end surface;
22 front end surface;
24 leading bottom holding pin;
26 leading top holding pin;
28 top edge holding pin;
30 trailing top holding pin;
32 trailing bottom holding pin;
34 leading separation;
36 trailing separation;
38 lengthwise piece;
40 top edge;
42 upper confronting side surface section;
43 lower confronting side surface section;
44 bottom edge;
46 inner layer section;
48 gusset;
50 trailing corner portion;
52 bottom tag cord holding pin;
53 mid-section of the lengthwise piece;
54 leading tag cord holding pin;
56 trailing tag cord holding pin;
58 tag;
59 mid-section of the tag cord;
60 confronting tag surface;
62 tag folding line;
64 tag cord;
66 tag cord feeder;
68 movable arm;
70 tag loop (dotted line);
72 V-shaped pattern;
74 fixing length;
76 heat-sealable cord;
77 tag welding wheel;
78 heat-sealable cord loop (dotted line);
80 sealable cord feeder;
81 U-shaped pattern/pattern;
82 leading segment;
84 oblique segment;
86 leading corner section/unsealed corner section;
90 top edge segment;
90L leading top edge segment;
90T trailing top edge segment;
92 trailing segment;
94 disposable lengthwise piece;
95 cord remover;
96 confronting side surface;
97 fixed end of the tag cord;
98 bottom side surface section;
99 pressing drum;
100 heated drum;
101 folding rolls;
102 trailing drum;
104 pressing belt;
106 vertical pressing element;
108 folded web;
109 vertical spine;
110 leading vertical seal;
112 trailing vertical seal;
113 pocket;
114 separation element;
116 leading edge;
117 trailing edge;
118 leading seal;
119 oblique seal;
120 top edge seal;
120L leading top edge seal;
120T trailing top edge seal;
121 trailing seal;
122 bottom fold;
124 inner loop;
P pouch;
PE area of heating for welding vertical seals;
S securing position area for fixing one end of the tag cord to the web 10;
TD traveling direction;
TC-W area for tacking the tag cord 64 to the web 10;
HSC-W area for fixing the heat-sealable cord 76 to the web;
10T-W area for tacking the tag 58 to the web 10; and
"1" numbers of processing stations.

What is claimed is:

1. A method for making pouches having confronting side surfaces that are used in brewable or extractable commodities, wherein the method comprises:
providing a continuous heat-sealable cord that is arranged on a continuous web that is folded with the confronting side surfaces joined along a bottom edge;
laying the continuous heat-sealable cord on an outer circumferential surface of a drum in a predetermined pattern and around holding pins projecting from the outer circumferential surface to define the predetermined pattern for joining the confronting side surfaces by fusing the continuous heat-sealable cord; and
placing a tag on the drum;
laying a tag cord on the outer circumferential surface of the drum in a tag pattern which extends over the tag;
laying the web on the drum;
tacking the web to the tag cord and/or the continuous heat-sealable cord;
folding the web, and
fusing, by heating, the continuous heat-sealable cord to form a melt that interfuses the confronting side surfaces along a first vertical edge, a second vertical edge of the folded confronting side surfaces of a lengthwise piece of the web forming an open pocket configured to arrange the brewable or extractable commodity therein, wherein the continuous heat-sealable cord is fused thereafter to form a melt along a top edge forming the pouch by ultimately forming a first vertical seal, a second vertical seal and a top seal.

2. The method according to claim 1, wherein the web is laid on the outer circumference of the drum and above the predetermined pattern of the continuous heat-sealable cord and the holding pins are retracted as the web is laid against the drum.

3. The method according to claim 1, wherein the tag is folded to include a predetermined fixing length of the tag cord.

4. The method according to claim 3, wherein the continuous heat-sea table cord is laid on the outer circumferential surface of the drum after the tag has been folded.

5. The method according to claim 1, wherein the tag is secured to the top edge of the pouch.

6. The method according to claim 1, wherein a mid-section of the tag cord is secured to the web at a position corresponding to a bottom section of the web adapted to form a bottom of the pouch.

7. The method according to claim 1, wherein the tag cord is laid on the drum in a V-shaped pattern for each lengthwise piece of the web corresponding to a single pouch,
  wherein the V-shaped pattern is secured by three tag cord holding pins and the web is placed on the drum such that a mid-section of the unfolded web is arranged at a position corresponding to the location of a bottom tag cord holding pin with the two other tag cord holding pins being arranged alongside of the web.

8. The method according to claim 1, wherein the tag cord is provided as a continuous cord and is cut after having been fixed to the web and the tag arranged adjacent to two cord holding pins.

\* \* \* \* \*